(12) United States Patent
Choi et al.

(10) Patent No.: US 7,081,868 B2
(45) Date of Patent: Jul. 25, 2006

(54) RECEPTION ANTENNA OF TIRE PRESSURE MONITORING SYSTEM USING RADIATING LEAKAGE COAXIAL CABLE

(75) Inventors: Sang Hoon Choi, Ichon-si (KR); Dong Pil Chun, Ichon-si (KR); Dae Hyuk Kwon, Ichon-si (KR); Heu Kyong Na, Ichon-si (KR); Sang Kook Kim, Ichon-si (KR); Hang Kee Cho, Ichon-si (KR); Won Jo Lee, Ichon-si (KR)

(73) Assignee: Hyundai Autonet Co., Ltd. (KR)

( * ) Notice: Subject to any disclaimer, the term of this patent is extended or adjusted under 35 U.S.C. 154(b) by 0 days.

(21) Appl. No.: 10/967,429

(22) Filed: Oct. 18, 2004

(65) Prior Publication Data
US 2005/0128156 A1    Jun. 16, 2005

(30) Foreign Application Priority Data
Oct. 29, 2003  (KR) .................... 10-2003-0075734

(51) Int. Cl.
*H01Q 1/36* (2006.01)
(52) U.S. Cl. ...................... 343/897; 343/711
(58) Field of Classification Search ............... 343/873, 343/897, 711, 713; 340/438, 445, 447
See application file for complete search history.

(56) References Cited

U.S. PATENT DOCUMENTS

| | | | |
|---|---|---|---|
| 5,963,128 A * | 10/1999 | McClelland | 340/447 |
| 6,774,777 B1 * | 8/2004 | Tsujita | 340/445 |
| 6,809,700 B1 * | 10/2004 | Benedict et al. | 343/872 |
| 6,899,153 B1 * | 5/2005 | Pollack et al. | 152/152.1 |
| 2002/0130771 A1 * | 9/2002 | Osborne et al. | 340/438 |
| 2005/0088361 A1 * | 4/2005 | Kelly et al. | 343/873 |

* cited by examiner

*Primary Examiner*—Hoang V. Nguyen
(74) *Attorney, Agent, or Firm*—Hovey Williams LLP

(57) ABSTRACT

The present invention relates to a reception antenna structure of a tire pressure monitoring system. The reception antenna is implemented using a cable-type antenna connected to a receiver of the tire pressure monitoring system. The cable-type antenna enables a mounting position of the antenna to be freely changed and improves a reception rate for measured data about temperature and pressure of a tire, that is modulated into data in the UHF band and transmitted to the outside of the tire in a wireless manner by a transmitter. According to the present invention, the reception antenna of a tire pressure monitoring system is implemented using a radiating leakage coaxial cable so as to enable the position of the antenna to be freely changed, so that, when tire pressure data is measured by a temperature and pressure sensor included in the transmitter within the tire and then transmitted through a tire pressure monitoring transmitter in a wireless manner, the reception sensitivity for the measured data is improved, thus increasing the reliability of the data measured at the tire, and guaranteeing the stability of the tire on the basis of the reliability of the reception sensitivity for the measured data.

4 Claims, 5 Drawing Sheets

RECEPTION ANTENNA OF TIRE PRESSURE MONITORING SYSTEM USING RADIATING LEAKAGE COAXIAL CABLE

BACKGROUND OF THE INVENTION

1. Field of the Invention

The present invention relates, in general, to a reception antenna structure of a tire pressure monitoring system and, more particularly, to a reception antenna of a tire pressure monitoring system using a radiating leakage coaxial cable, in which the reception antenna of the tire pressure monitoring system is implemented using the radiating leakage coaxial cable, thus further improving reception performance for measured data transmitted in a wireless manner, when a transmitter transmits tire pressure data measured by a temperature and pressure sensor included in the transmitter within a tire in a wireless manner. Korean application number 10-2003-0075734 filed Oct. 29, 2003 is hereby incorporated by reference.

2. Description of the Related Art

As well known to those skilled in the art, a tire pressure monitoring system (TPMS) used in automobiles includes a sensor 1 for measuring the internal temperature and pressure of a tire, a transmitter 2 for modulating data measured by the sensor 1 into data in an Ultra High Frequency (UHF) band, and transmitting the modulated data to the outside of the tire in a wireless manner, a receiver 3 for receiving the measured data transmitted from the transmitter 2 in a wireless manner, and a display unit 4 for displaying the measured data received by the receiver 3 on a liquid crystal display (LCD) screen to allow a driver to monitor the measured data, as shown in FIG. 1.

In this case, the sensor 1 and the transmitter 2 are installed within the tire, and the receiver 3 and the display unit 4 are installed outside of the tire.

In this way, in the case where the sensor 1 installed within the tire measures the temperature and pressure of the tire, the tire pressure monitoring system is operated so that measured temperature and pressure data for the tire are transmitted to the receiver 3 installed outside of the tire in a wireless manner through the transmitter 2, the receiver 3 transmits the received data to the display unit 4, and then the display unit 4 displays the measured data, such as the tire pressure and temperature, on the LCD screen.

At this time, the tire pressure monitoring system must guarantee reliability and stability in the characteristics thereof. Therefore, the tire pressure monitoring system is equipped with a reception antenna having a wireless interface function of enabling the measured data to be exactly received from the sensor 1. In this case, wavelength/4 ($\lambda/4$) monopole antennas 5 and 5' are mainly used as the reception antenna, as shown in FIG. 1.

However, for the typical monopole antennas 5 and 5', the reception characteristics thereof are influenced by the electromagnetic characteristics according to the materials, constructions, sizes and designs of automobiles. Therefore, in the prior art, the reception sensitivities of the monopole antennas 5 and 5' differ according to the constructions, sizes and designs of automobiles as well as the materials thereof, so that the monopole antennas 5 and 5' cannot satisfy standard criteria.

Therefore, in the prior art, a method of changing the position of the monopole antennas 5 and 5' or arranging two or more $\lambda/4$ monopole antennas 5 and 5' at suitable positions is used so as to improve the reception sensitivities of the antennas.

However, the above method is problematic in that, as the size of an automobile and the number of tires are increased, great efforts are required to estimate the optimal positions of the monopole antennas 5 and 5', thus increasing the economic load due to the increased number of the monopole antennas.

Moreover, the above method is disadvantageous in that, since metal parts of the monopole antennas 5 and 5' are consistently exposed to external environments, the monopole antennas 5 and 5' are easily deformed or corroded due to the external factors, such as moisture and dust, as well as external physical impacts, thus the lifespan of the antennas is shortened.

For example, if the reception sensitivities of $\lambda/4$ monopole antennas are measured after the monopole antennas are applied to a truck equipped with 10 tires, it can be seen that the reception sensitivities for data measured at the monopole antennas are remarkably decreased, and deviations between measured data respectively obtained from the 10 tires are excessively increased due to the decrease of the reception sensitivities, as shown in FIG. 2.

SUMMARY OF THE INVENTION

Accordingly, the present invention has been made keeping in mind the above problems occurring in the prior art, and an object of the present invention is to provide a reception antenna of a tire pressure monitoring system, which is implemented using a radiating leakage coaxial cable (Radiax cable) so as to enable the position of the antenna to be freely changed, so that, when tire pressure data is measured by a temperature and pressure sensor included in a transmitter within a tire and then transmitted through a tire pressure monitoring transmitter in a wireless manner, the reception sensitivity for the measured data is improved, thus increasing the reliability of the data measured at the tire, and guaranteeing the stability of the tire on the basis of the reliability of the reception sensitivity for the measured data.

Another object of the present invention is to provide a reception antenna of a tire pressure monitoring system, in which a radiating leakage coaxial cable is installed to be adjacent to tires, so that the reception sensitivity of the antenna is not influenced by the sizes of automobiles as well as the constructions, designs and materials thereof, and reception deviations between data measured at respective tires are reduced.

A further object of the present invention is to provide a reception antenna of a tire pressure monitoring system, in which a radiating leakage coaxial cable constituting the reception antenna is coated with a covering material having strong environmental resistance, thus solving a problem that the lifespan of the antenna is shortened in the prior art while preventing the deformation or corrosion of the antenna due to external factors, such as moisture and dust, as well as external physical impacts.

In order to accomplish the above object, the present invention provides a reception antenna of a tire pressure monitoring system, the system having a sensor for measuring internal temperature and pressure of at least one tire, a transmitter for modulating data measured by the sensor into data in an Ultra High Frequency (UHF) band, and transmitting the modulated data to an outside of the tire in a wireless manner, a receiver for receiving the measured data transmitted from the transmitter in a wireless manner, and a display unit for displaying the measured data received by the receiver on a liquid crystal display (LCD) screen to allow a driver to monitor the measured data, wherein the reception antenna is implemented using a cable-type antenna connected to the receiver, the cable-type antenna enabling a mounting position of the antenna to be freely changed and improving a reception rate for the measured data about the temperature and pressure of a tire, that is modulated into the data in the UHF band and transmitted to the outside of the tire in a wireless manner by the transmitter.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
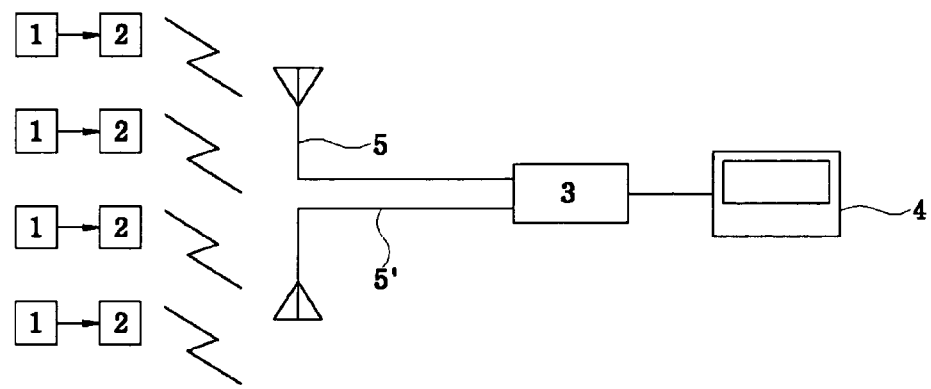
FIG. 1 is a view showing the construction of a conventional tire pressure monitoring system to which a linear antenna is applied.
Figure 2:
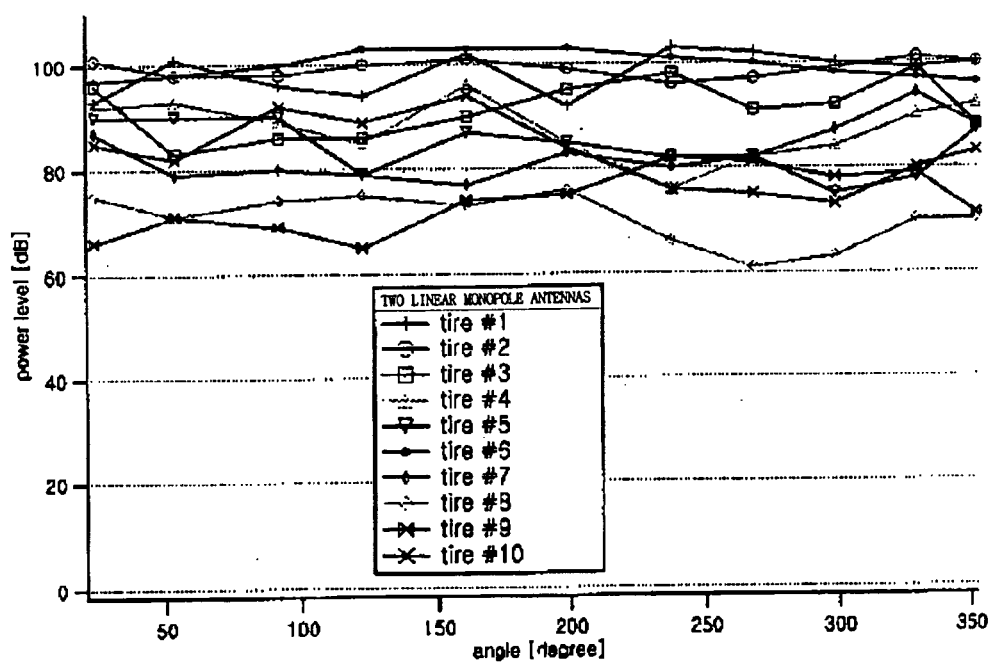
FIG. 2 is a graph showing the reception sensitivities of monopole antennas applied to the conventional tire pressure monitoring system.

Hereinafter, embodiments of the present invention will be described in detail with reference to the attached drawings.

Reference now should be made to the drawings, in which the same reference numerals are used throughout the different drawings to designate the same or similar components.

Figure 3:
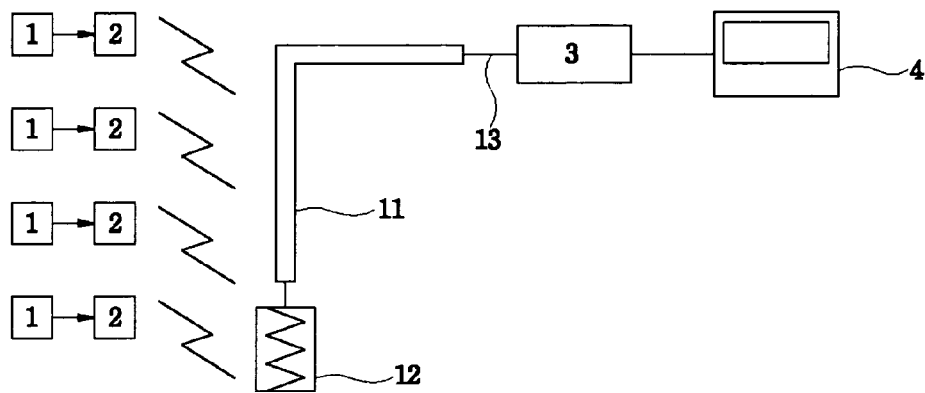
FIG. 3 is a view showing the construction of a tire pressure monitoring system using a reception antenna implemented by a radiating leakage coaxial cable according to an embodiment of the present invention.
Figure 5:
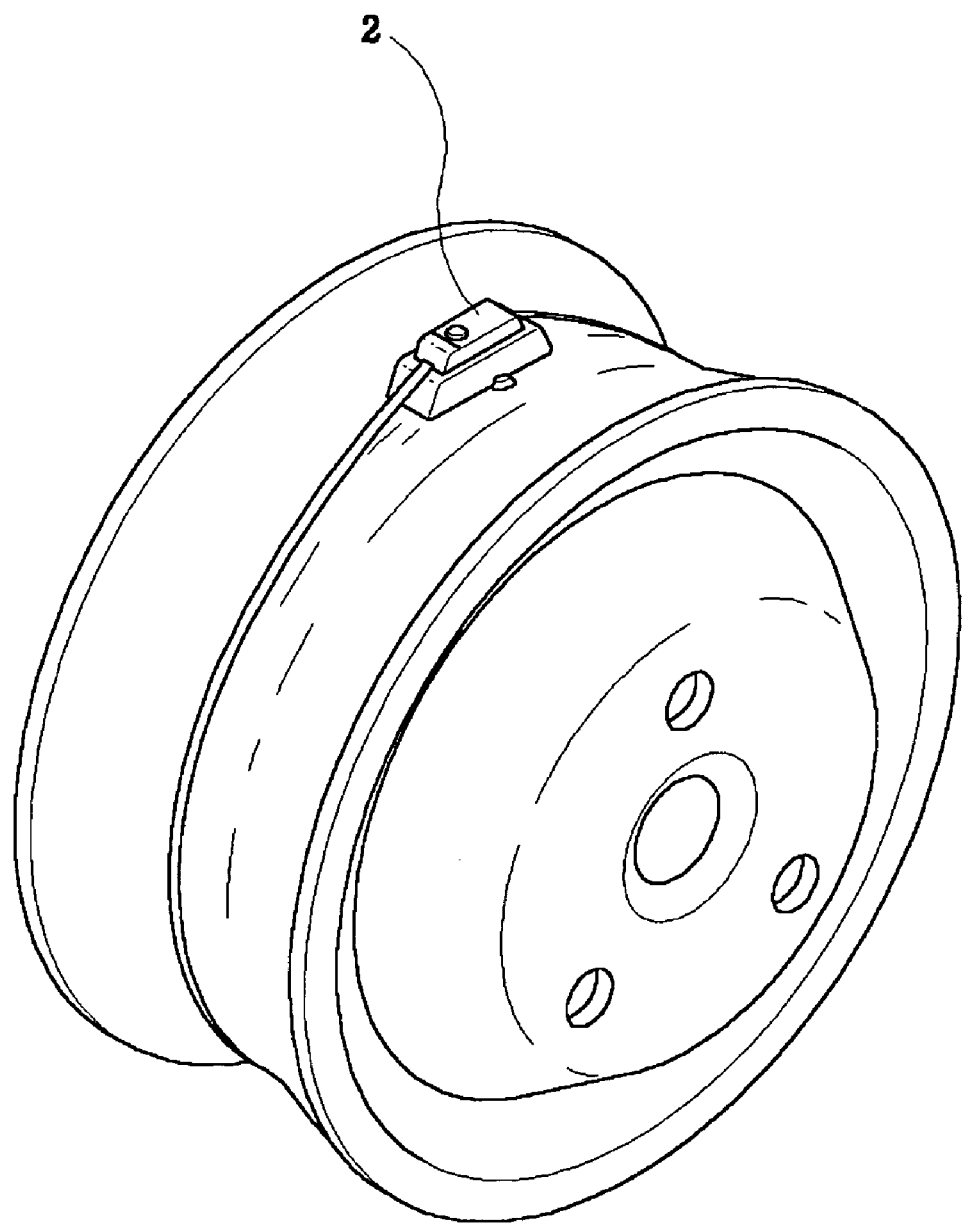
FIG. 5 is a view showing the status of a transmitter, having a sensor therein, mounted on a vehicle wheel according to an embodiment of the present invention.

FIG. 3 is a view showing the construction of a tire pressure monitoring system using a reception antenna implemented by a radiating leakage coaxial cable according to an embodiment of the present invention, and FIG. 5 is a view showing the status of a transmitter, having a sensor therein, mounted on a vehicle wheel according to an embodiment of the present invention.

Figure 6:
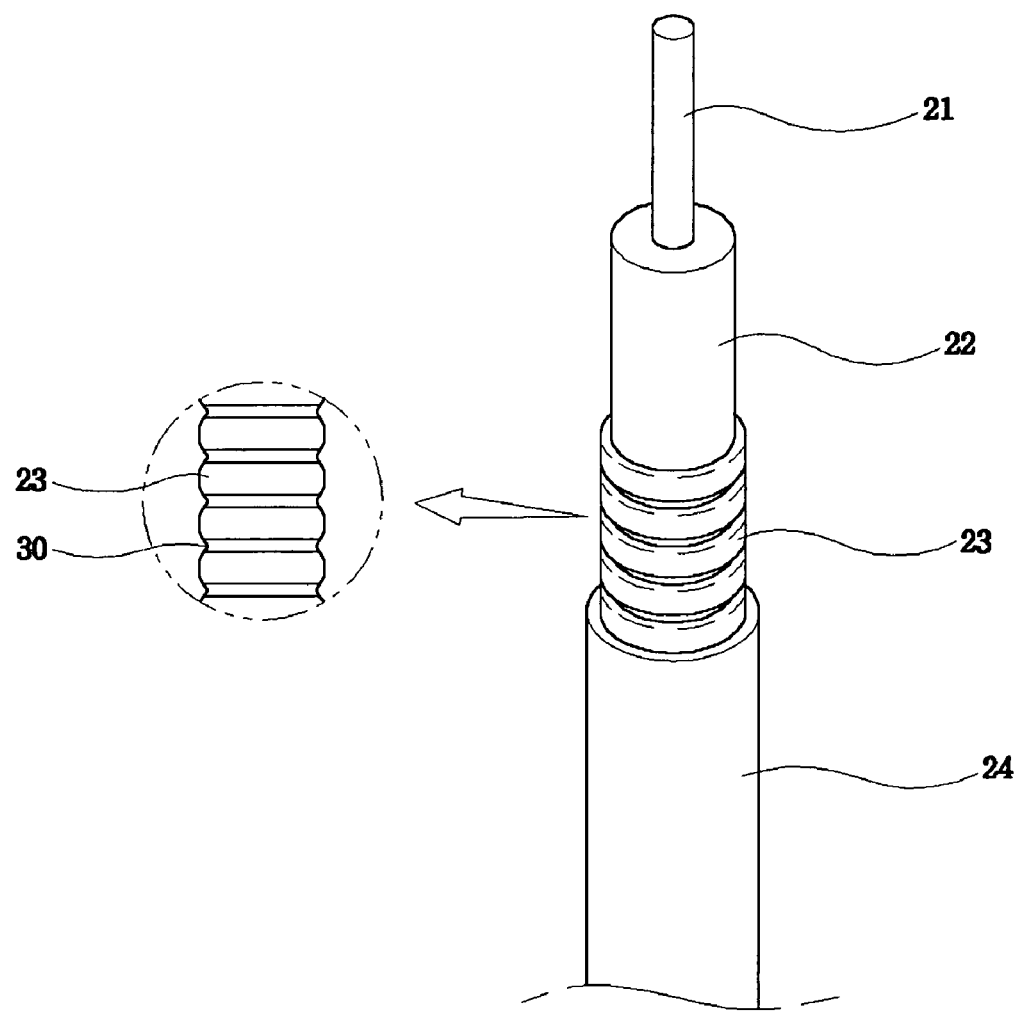
FIG. 6 is a view showing the construction of an antenna having grooves formed at regular intervals on a corrugated conductor surrounding a dielectric according to another embodiment of the present invention.
Figure 7:
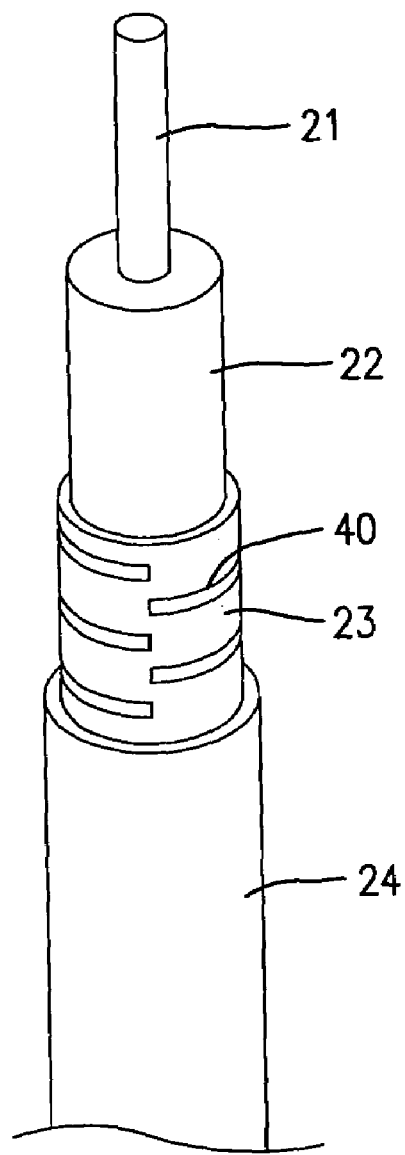
FIG. 7 is a view showing the construction of an antenna having alternately arranged slots formed in a corrugated conductor surrounding a dielectric according to a further embodiment of the present invention.

FIG. 6 is a view showing the construction of an antenna having grooves formed at regular intervals on a corrugated conductor surrounding a dielectric according to another embodiment of the present invention, and FIG. 7 is a view showing the construction of an antenna having alternately-arranged slots formed in a corrugated conductor surrounding a dielectric according to a further embodiment of the present invention.

As shown in FIGS. 3, 5 and 6, the tire pressure monitoring system includes a sensor 1 for measuring the internal temperature and pressure of a tire, a transmitter 2 having the sensor 1 therein to modulate data specified by the sensor 1 into data in an Ultra High Frequency (UHF) band, and transmitting the modulated data to the outside of the tire in a wireless manner, a receiver 3 for receiving the measured data transmitted from the transmitter 2 in a wireless manner, and a display unit 4 for displaying the measured data received by the receiver 3 on a Liquid Crystal Display (LCD) screen to allow a driver to monitor the measured data.

Further, one aspect of the present invention is characterized in that the receiver 3 is connected to a cable-type antenna, which enables the mounting position of the antenna to be freely changed and improves a reception rate for the measured data about the temperature and pressure of a tire, which is modulated into the data in the UHF band and transmitted to the outside of the tire in a wireless manner by the transmitter 2.

Another aspect of the present invention is characterized in that the cable-type antenna includes a radiating leakage coaxial cable 11 and a matching terminal 12. The radiating leakage coaxial cable 11 has grooves 30 formed at regular intervals in a corrugated conductor 23 surrounding a dielectric 22, and thus operates in a wide frequency band so that the cable 11 receives measured data at the tire by a wireless transmission from the transmitter 2 while forming a gain pattern with sufficient intensity regardless of the mounting position of the antenna. The matching terminal 12 performs termination impedance matching (for example, 50Ω) when the radiating leakage coaxial cable 11 receives the measured data.

Reference numeral 21 is an iron core.

A further aspect of the present invention is characterized in that the radiating leakage coaxial cable 11 is protected by a covering material 24 with excellent environmental resistance so as to prevent the deterioration of the characteristics due to surface pollution or secular change.

A still another aspect of the present invention is characterized in that the radiating leakage coaxial cable 11 is arranged at a position closest to the tire and then directly connected to the receiver 3.

A still another aspect of the present invention is characterized in that radiating leakage coaxial cable 11 is divided and separately arranged with respect to respective tires depending on the arrangement of the tires, and is connected to the receiver 3 through a leakage coaxial cable (LCX) 13, in which slots 40 are formed to be alternately arranged in a longitudinal direction on either side of an outer conductor 23 and which is only operated in a specific frequency band, so as to transmit measured data signals in the UHF band to the receiver 3 without attenuation, when the radiating leakage coaxial cable 11 is spaced apart from the receiver 3 due to the arrangement thereof.

A still another aspect of the present invention is characterized in that contact portions between the radiating leakage coaxial cable 11 and the matching terminal 12 and between the radiating leakage coaxial cable 11 and the leakage coaxial cable 13 are waterproofed by a waterproofing material so as to prevent the occurrence of a phenomenon in which the deformation or corrosion due to the external factors, such as moisture and dust, as well as external physical impacts, is generated and thus the lifespan of the antenna is shortened.

In this case, the waterproofing material may be one of a urethane waterproofing material, an elastic coating waterproofing material, and anti-dewing paint.

The operation of the reception antenna of the tire pressure monitoring system having the above construction according to the embodiment of the present invention is described with reference to FIGS. 3 to 7.

First, the transmitter 2 having the sensor 1 therein is installed within a tire, and the receiver 3 and the display unit 4 are installed outside of the tire, respectively, as the tire pressure monitoring system.

In this case, a cable-type antenna is connected to the receiver 3 to receive data, measured by the sensor 1 and transmitted from the transmitter 2 in a wireless manner, in a wireless manner.

That is, the cable-type antenna is comprised of the radiating leakage coaxial cable 11 having grooves 30 formed at regular intervals in a corrugated outer conductor 23, which surrounds a dielectric, as shown in FIG. 6, and thus operates in a wide frequency band so that the antenna easily receives measured data at the tire by a wireless transmission from the transmitter 2 while forming a gain pattern with sufficient intensity regardless of the mounting position of the antenna, and the matching terminal 12 that performs termination impedance matching (for example, 50Ω) when the radiating leakage coaxial cable 11 receives the measured data.

Then, the radiating leakage coaxial cable 11 is coated with a covering material 24 with excellent environmental resistance so as to prevent the deterioration of the characteristics due to surface pollution or secular change. Thereafter, the radiating leakage coaxial cable 11 coated with the covering material is arranged at a certain position closest to the tire while being directly connected to the receiver 3.

Then, the radiating leakage coaxial cable 11 can receive measured data and transmit the measured data to the receiver 3 when the measured data from the sensor 1 are modulated into data in the UHF band and transmitted to the outside of the tire in a wireless manner by the transmitter 2.

At this time, the radiating leakage coaxial cable 11 is connected to the matching terminal 12, which performs termination impedance matching using an impedance of 50Ω when the measured data in the UHF band are received by the radiating leakage coaxial cable 11.

Figure 4:
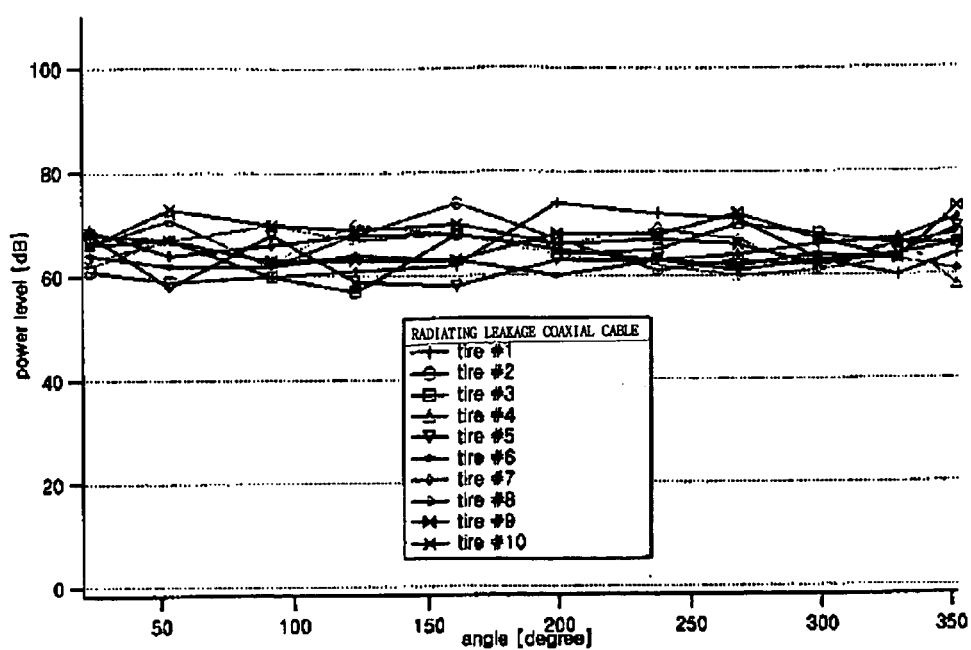
FIG. 4 is a graph showing the reception sensitivity of the radiating leakage coaxial cable applied to the tire pressure monitoring system of the present invention.

For example, as shown in FIG. 4, when the temperature and the pressure of tires are measured with respect to a truck equipped with 10 tires, the reception sensitivities of the antenna are excellent, and deviations between the data measured at the 10 tires almost do not exist.

In the meantime, if the number of tires is large and then the tires form several groups or respective tires are positioned far from each other, the radiating leakage coaxial cable 11 is divided and separately arranged with respect to respective groups of the tires or respective tires.

At this time, in the case where the radiating leakage coaxial cable 11 is divided and separately arranged with respect to the groups or tires, the radiating leakage coaxial cable 11 is inevitably spaced apart from the receiver 3 according to the mounting environment thereof.

Therefore, the radiating leakage coaxial cable 11 is connected to the receiver 3 through the leakage coaxial cable (LCX) 13 in which the alternately arranged slots 40 are formed in the outer conductor 23 to only operate in a specific frequency band, as shown in FIG. 7.

Therefore, when the radiating leakage coaxial cable 11 receives the measured data at the tires, the measured data in the UHF band can be easily transmitted to the receiver 3 without attenuation.

In this case, when the leakage coaxial cable 13 is connected to the radiating leakage coaxial cable 11, the contact portion between the radiating leakage coaxial cable 11 and the matching terminal 12 as well as the contact portion between the radiating leakage coaxial cable 11 and the leakage coaxial cable 13 are waterproofed by a waterproofing material, such as a urethane waterproofing material, an elastic coating waterproofing material or anti-dewing paint. Therefore, there can be prevented the occurrence of a phenomenon, in which the deformation or corrosion due to the external factors, such as moisture and dust, as well as the external physical impacts is generated and thus the lifespan of the antenna is shortened.

In addition, when the radiating leakage coaxial cable 11 is arranged in an automobile, such as a bus or truck, it is mounted to a lower frame of the automobile by use of an electrical insulator. This operation is performed so as to prevent the occurrence of a phenomenon in which the deformation or corrosion due to the external factors, such as moisture and dust, as well as the external physical impacts, is generated and thus the lifespan of the antenna is shortened.

In this case, a reason for using the radiating leakage coaxial cable 11 as an antenna is that the allowable radius of curvature of the radiating leakage coaxial cable 11 is smaller than that of the leakage coaxial cable 13 which is implemented using only a single cable and to which a separate supporting wire is attached in parallel, so that the degree of freedom according to the mounting operation of the antenna is high.

As described above, the present invention provides a reception antenna of a tire pressure monitoring system, which is implemented using a radiating leakage coaxial cable so as to enable the position of the antenna to be freely changed, so that, when tire pressure data is measured by a temperature and pressure sensor placed within the tire and then transmitted through a tire pressure monitoring transmitter in a wireless manner, the reception sensitivity for the measured data is improved, thus increasing the reliability of the data measured at the tire, and guaranteeing the stability of the tire on the basis of the reliability of the reception sensitivity for the measured data.

Further, the present invention is advantageous in that a radiating leakage coaxial cable can be installed to be adjacent to a tire, thus preventing the reception sensitivity of the antenna from being influenced by the sizes of automobiles as well as the constructions, designs and materials thereof, and reception deviations between data measured at respective tires are reduced. Further, the radiating leakage coaxial cable is coated with a covering material having strong environmental resistance, thus solving a problem in that the lifespan of the antenna is shortened in the prior art, while preventing the deformation or corrosion of the antenna due to the external factors, such as moisture and dust, as well as external physical impacts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reception antenna of a tire pressure monitoring system, the system having a sensor for measuring internal temperature and pressure of at least one tire, a transmitter for modulating data measured by the sensor into data in an Ultra High Frequency (UHF) band, and transmitting the modulated data to an outside of the tire in a wireless manner, a receiver for receiving the measured data transmitted from the transmitter in a wireless manner, and a display unit for displaying the measured data received by the receiver on a liquid crystal display (LCD) screen to allow a diver to monitor the measured data, wherein:

the reception antenna is implemented using a cable-type antenna connected to the receiver, the cable-type antenna enabling a mounting position of the antenna to be freely changed and improving a reception rate for the measured data about the temperature and pressure of a tire, that is modulated into the data in the UHF band and transmitted to the outside of the tire in a wireless manner by the transmitter;

wherein the cable-type antenna comprises:

a radiating leakage coaxial cable, which has grooves formed at regular intervals in a corrugated outer conductor, which surrounds a dielectric, and thus operates in a wide frequency band so that the antenna receives the measured data at the tire by a wireless transmission from the transmitter while forming a gain pattern with sufficient intensity regardless of the mounting position of the antenna; and a matching terminal for performing termination impedance matching when the radiating leakage coaxial cable receives the measured data.

2. The reception antenna of the tire pressure monitoring system according to claim 1, wherein the radiating leakage coaxial cable is arranged at a position closest to the tire and then directly connected to the receiver.

3. The reception antenna of the tire pressure monitoring system according to claim 1, wherein:

the radiating leakage coaxial cable is divided and separately arranged with respect to the respective tires depending on arrangement of the tires; and the radiating leakage coaxial cable is connected to the receiver through a leakage coaxial cable, in which slots are formed to be alternately arranged in a longitudinal direction on either side of an outer conductor and which is only operated in a specific frequency band, so as to transmit measured data signals in the UHF band to the receiver without attenuation, when the radiating leakage coaxial cable is spaced apart from the receiver due to the arrangement thereof.

4. The reception antenna of the tire pressure monitoring system according to claim 1 or 3, wherein the radiating leakage coaxial cable, the matching terminal and the leakage coaxial cable are constructed so that contact portions between the radiating leakage coaxial cable and the matching terminal and between the radiating leakage coaxial cable and the leakage coaxial cable are waterproofed by a waterproofing material, such as a urethane waterproofing material, an elastic coating waterproofing material or anti-dewing paint, so as to prevent an occurrence of a phenomenon in which deformation or corrosion due to external factors, such as moisture and dust, as well as external physical impacts, is generated and thus a lifespan of the antenna is shortened.

* * * * *